(12) United States Patent
Nebendahl

(10) Patent No.: US 7,397,543 B2
(45) Date of Patent: Jul. 8, 2008

(54) OPTICAL REFLECTOMETRY ANALYSIS WITH A TIME-ADJUSTMENT OF PARTIAL RESPONSES

(75) Inventor: Bernd Nebendahl, Ditzingen (DE)

(73) Assignee: Agilent Technologies Inc., Santa Clara, CA (US)

( * ) Notice: Subject to any disclaimer, the term of this patent is extended or adjusted under 35 U.S.C. 154(b) by 50 days.

(21) Appl. No.: 11/444,085

(22) Filed: May 31, 2006

(65) Prior Publication Data

US 2007/0018635 A1 Jan. 25, 2007

(30) Foreign Application Priority Data

Jul. 19, 2005 (EP) .................................. 05106603

(51) Int. Cl.
*G01N 21/00* (2006.01)

(52) U.S. Cl. ..................................... 356/73.1

(58) Field of Classification Search ........................ None
See application file for complete search history.

(56) References Cited

U.S. PATENT DOCUMENTS 5,363,463 A 11/1994 Kleinerman

| 5,592,282 | A | * | 1/1997 | Hartog | ........................ 356/44 |
|---|---|---|---|---|---|
| 5,618,108 | A | | 4/1997 | Sai et al. | |
| 2003/0011776 | A1 | | 1/2003 | Ogawa | |
| 2003/0128354 | A1 | | 7/2003 | Fayer et al. | |
| 2003/0152321 | A1 | | 8/2003 | Koch et al. | |

FOREIGN PATENT DOCUMENTS

| EP | 0 681 172 | 11/1995 |
|---|---|---|
| EP | 1 134 572 | 9/2001 |
| EP | 1 258 718 | 11/2002 |
| EP | 1 526 368 | 4/2005 |
| GB | 2 182 222 | 10/1985 |
| WO | WO 01/22539 | 3/2001 |

* cited by examiner

*Primary Examiner*—Tu T Nguyen

(57) ABSTRACT

Determining a physical property of a device under test—DUT—includes receiving an optical scatter signal returning from the DUT in response to a probe signal launched into the DUT, wavelength dependent separating a first response signal and a second response signal from the scatter signal, determining a first power information of the first response signal and a second power information of the second response signal, time-adjusting the first power response and the second power response to each other in order to compensate a group velocity difference between the first response signal and the second response signal within the DUT, and determining the physical property on the base of the time-adjusted power responses.

11 Claims, 4 Drawing Sheets

OPTICAL REFLECTOMETRY ANALYSIS WITH A TIME-ADJUSTMENT OF PARTIAL RESPONSES

BACKGROUND

The present invention relates to determining an physical property of a device under test by optical reflectometry measurements.

For determining optical properties of an optical device under test (DUT), e.g. an optical fiber, it is known to apply a so-called optical time domain reflectometry (OTDR) or optical frequency domain reflectometry (OFDR). For that purpose an optical signal is coupled into the DUT, which travels along the DUT and which is partly scattered by the DUT, e.g. due to inhomogeneities in the silica structure (Rayleigh scattering) along the optical fiber or due to interaction of the optical signal with optical phonons (Raman scattering) or acoustical phonons (Brillouin scattering). Some of the scattered light travels back to the DUT input. The power of this returning light is measured and evaluated.

It is further known to separate different spectral components of the backscattered light from an optical fiber and to put these components into relation in order to obtain a physical property of the fiber. Well-known scatter signals returning at different wavelengths are so-called Raman scatterings. An arrangement for measuring a temperature distribution along an optical fiber by determining Raman scatterings is e.g. described in U.S. Pat. No. 5,618,108. The related technical background is e.g. described, in "Optical Fiber Communications" by J. Senior, Prentice Hall, 1992, pages 91-96.

SUMMARY OF THE DISCLOSED EMBODIMENTS

It is an object of the invention to provide an improved determination of a physical property of a DUT. The object is solved by the independent claims. Further embodiments are shown by the dependent claims.

According to an embodiment of the invention, an optical scatter signal returning from the DUT in response to a probe signal launched into the DUT is received and separated into a first response signal and a second response signal dependent on the wavelength. By converting the optical signals into electrical signals, a first power information or response over the time and a second power information or response over the time are determined from the first and second response signals correspondingly.

To obtain time domain signals, different methods exist. A first method also known as optical time domain reflectometry (OTDR), directly measures the signals in the time domain. A further method also known as optical frequency domain reflectometry (OFDR) uses a frequency-modulated signal, where the frequency is swept while the reflected intensity is recorded. This intensity versus frequency signal is transformed in the time domain using a Fourier transformation. After the transformation the obtained information is identical to the time domain method and any further corrections and calculations described here can be used.

The chromatic dispersion of an optical material of the DUT leads to significant differences in the speed of light of different spectral components of a light signal traveling through the material. Thus, the group velocity of different spectral parts on an optical signal will be different.

As the first response signal and the second response have different frequency (or wavelength) spectra, both signals will have different group velocities, when traveling through DUT showing a chromatic dispersion behavior. Thus, e.g. the centers of two optical pulses having different frequency spectra will arrive at different time instances, when being sent simultaneously. In order to relate the first and second power responses over the time to each other the first power response signal over the time and the second power response signal over the time are time-adjusted to each other in order to compensate a group velocity difference between the first response signal and the second response signal within the DUT. The physical property of the DUT is determined on the base of the time-adjusted power responses.

In a further embodiment, the analyzer is adapted for determining an adjusted first power response over the time by stretching or compressing the time scale of the first power response over the time by a time scale conversion factor. The time scale conversion factor can be either determined on the base of known properties of the DUT, or on the base of reflection measurements, e.g. on the base of the first power response and the second power response. Accordingly, a first possibility is to determine the conversion factor on the base of the dispersion coefficient of the DUT, and the wavelength difference between a first center wavelength $\lambda_1$ of a wavelength spectrum of the first response signal and a second center wavelength $\lambda_2$ of a wavelength spectrum of the second response signal.

A further possibility to determine the time scale conversion factor is to calculate the ratio of the first traveling time of the first response signal, and the second traveling time of the second response signal through the DUT. Therefore, the time difference ($\Delta t$) might be determined by timely relating a first edge or peak of the first response signal over the time and a second response edge or peak of the second response signal over the time, wherein both edges or peaks are related to a distinct location of the DUT, e.g. a splice or the far end of the DUT.

In an embodiment, the physical property is a temperature profile along the DUT. Therefore, the so-called Raman scatterings are evaluated by selecting a so-called Antistokes part as one of the response signals, and a so-called Stokes part as the other response signal.

In an embodiment, a temperature profile over the length of the DUT is determined by changing a dependency over the time using the ratio of the group velocity of the Stokes signal and the Antistokes signal as conversion factor.

In a further embodiment, the analyzer determines time discrete power response signals by sampling the continuous power responses at equidistant time instances. As the power values of the first power response, after the time-adjustment, are linear shifted, they do not fit to the time grid constituted by sampling. Therefore, a new set of discrete power values is determined from the sampled power values of the first time discrete power response by applying an interpolation algorithm, e.g. by applying a linear interpolation, a polynomial interpolation or a so-called spline interpolation, so that the interpolated values fit to the time grid of the second power response.

In a further embodiment, a control unit is provided to control and coordinate the light source, the selector, the detector and analyzer.

In a further embodiment, the control unit advises a modulator of the light source so that the stimulus signal comprises a plurality of optical pulses according to a digital sequence. The digital sequence might be a so-called pseudo noise sequence, a set of so-called Golay codes or any sequence that shows a single resulting pulse with small side lobe pulses after autocorrelation. In order to determine the resulting power responses, the analyzer performs a correlation function of the power of the probing signal with each both the power responses. This correlation might be performed by a digital convolution of the digital sequence and the sequence of sampled power values.

The advantage of such correlation methods is that the DUT responses comprise significantly more energy (depending on the number of pulses of the pulse sequence) compared to responses of a single pulse without reducing the spatial resolution.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied by the analyzer or by a control unit of the optical reflectometry system.

BRIEF DESCRIPTION OF DRAWINGS

Other objects and many of the attendant advantages of embodiments of the present invention will be readily appreciated and become better understood by reference to the following more detailed description of further embodiments in connection with the accompanied drawing(s). Features that are substantially or functionally equal or similar will be referred to with the same reference sign(s).

DETAILED DESCRIPTION OF THE DISCLOSED EMBODIMENTS

For the following examples, only application of OTDR is described. However, as described above, the invention is not limited to OTDR, but covers all reflectometry methods like OTDR or OFDR.

Figure 1:
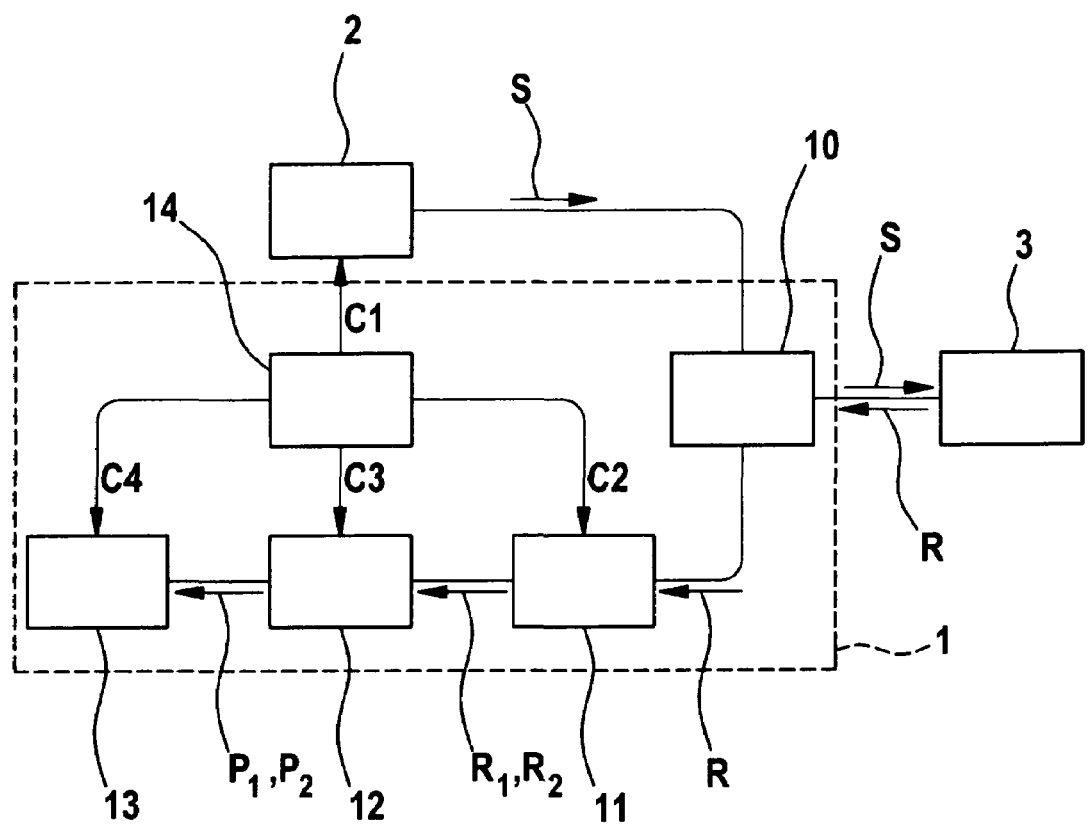
FIG. 1 shows a basic setup of an OTDR system connected to an exemplary optical device under test.

FIG. 1 shows an OTDR system 1, an optical source 2 and an optical device under test (DUT) 3. The OTDR system 1 comprises an optical coupler 10, an optical selector or splitter 11 an optical detector 12 and an analyzing unit 13 and a control unit 14. The optical coupler 10 optically connects the optical source 2, the DUT 3 and the optical splitter 11 to each other, such that a stimulus probe signal S emitted from the optical source 2 is provided to the DUT 3 and a response R returning from the DUT 3 is provided to the optical selector 11.

The optical selector 11 selects a first spectral part and a second spectral part of the response signal R and generates a first response signal R1 and a second response signal R2 correspondingly, and provides these signals R1 and R2 to the optical detector 12. The optical detector performs an opto-electrical conversion of the response signals R1 and R2, generates a first power response over the time P1 and a second power response over the time P2, and provides these signals to the analyzer 13.

The analyzer 13 performs a time adjustment of the power responses P1 and P2, preferably by stretching or compressing the time scale of one the power responses P1 or P2 by a time scale conversion factor CF. The conversion factor is thereby determined such that the difference in group velocity between the different spectral parts R1 and R2 are eliminated.

In an embodiment of the invention, the analyzer 13 determines the conversion factor CF on the base of the length l and the dispersion coefficient D dependent on the material and the geometry of the DUT 3, and the wavelength difference $\Delta\lambda$ between a first center wavelength $\lambda_1$ of a wavelength spectrum of the first response signal R1 and a second center wavelength $\lambda_2$ of a wavelength spectrum of the second response signal R2 according to the following formula:

$$\Delta t = D * L * \Delta\lambda, \text{ wherein}$$

D is the dispersion coefficient in picoseconds/(nanometer*kilometer)

L is the physical length of the DUT in kilometer, $\Delta\lambda$ is the wavelength difference $\Delta\lambda$ in nanometer as described above, and $\Delta t$ is the run time difference in picoseconds between both spectral parts.

By way of example, the first power response P1 is adapted to the second power response by changing the time scale of the first power response. Alternatively, the second power response can be adapted to the first power response or both power responses can be adapted to a third base.

The conversion factor CF to adapt the time scale of the first power response P1 to the second power response P2 is:

$$CF = t1/t2 = (t2 - \Delta t)/t2, \text{ wherein}$$

t1 is the run time of the first spectral part R1, and t2 is the run time of the second spectral part R2.

The time-adjusted first power response P1' can be written as:

$$P1'(t) = P1(t/CF)$$

For multimode fiber (e.g. Corning® InfiniCor® 50 µm) with a typical chromatic dispersion of −34.9 ps/nm/km at 1064 nm, a spectral width of the spectra of 100 nm and length of the fiber of 4 km the time delay becomes −13.9 ns (one way) and the conversion factor with an effective group index of 1.479 becomes 1.0004. For an exemplary distance of 4 km this leads to a spatial shift of 1.6 m.

In an alternative embodiment, the run times t1 and t2 through the DUT 3 of both response signals R1 R2 are directly measured by the OTDR. Direct measurement can be done by identifying significant events within the OTDR responses and relating them to a specific location of the DUT 3, e.g. determining the OTDR edges relating to an open end of the DUT 3 or OTDR peaks relating to a splice, connector, mirror end or any other localized event that influences the attenuation of the DUT 3.

The control unit 14 controls the light source 2, the optical selector 11, the detector 12 and the analyzer 13 by corresponding control signals C1-C4.

The probe signal S generated by the light source 2, preferably a laser diode with high output power, is preferably a narrow band signal at a transmission wavelength $\lambda_T$.

Scattering effects, e.g. Rayleigh scattering, Fresnel reflections, Raman or Brillouin scattering, cause a fraction of the forward traveling light to return from the DUT 3 eventually shifted in wavelength to the measurement system 1. Whereas the Raman and Brillouin backscattering signals are composed of Antistokes light and stokes light return at wavelengths different to the transmission wavelength $\lambda_T$, the Fresnel reflection or Rayleigh signals are returning the transmission wavelength $\lambda_T$.

In an embodiment, the physical property is a temperature profile along the DUT, e.g. an optical fiber installed along a drill hole. As the Raman Antistokes light is subject to temperature changes of the DUT, the Raman scatterings are evaluated by selecting the so-called Antistokes part as one of the response signals, and the so-called Stokes part as the other response signal. In the following, by way of example and without limiting thereto, the first response signal R1 will be regarded as the Antistokes part and the second response signal R2 will be regarded as the Stokes part.

Figure 4:
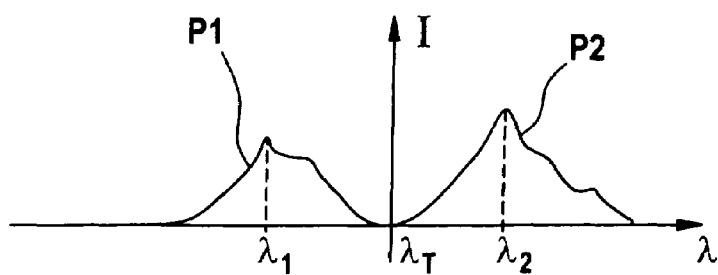
FIG. 4 shows the spectral intensity of the backscattered light.

FIG. 4 shows an exemplary sketch diagram depicting the intensity I of the first response signal R1 (Antistokes signal) and the second response signal R2 (Stokes signal) over the wavelength $\lambda$. Further, the transmission wavelength $\lambda_T$ the first center wavelength $\lambda_1$, and second center wavelength $\lambda_2$ are depicted at the wavelength axis.

In a possible realization, the transmission wavelength $\lambda_T$ is about 1064 nm, the first center wavelength at $\lambda_1$ of the Antistokes signal is about 1014 nm and the second center wavelength $\lambda_2$ of the Stokes signal is about 1114 nm. Thus for selecting the first and second response signals R1 and R2, corresponding band pass filters might each have a range of about 100 nm around first and second center wavelengths $\lambda_1$ and $\lambda_2$ respectively.

In an embodiment, the optical selector 11 provides both the first response signal R1 and the second response signal in parallel to a detector unit 12. This unit 12 might comprise two separate detector elements for detecting the first power response P1 and the second power response P2 correspondingly.

Alternatively, the first response signal R1 and the second response signal R2 are provided sequentially to one detector element 12. Therefore, the control unit 14 might in a first step instruct the light source 2 to provide a first probe signal to the DUT 3, and the selector 11 to select the first response signal R1. In a second step, the light source 2 is instructed to provide a second probe signal and the selector 11 to select the second response signal R2. Switching the selection within the selector 11 might be performed by moving an optical shutter such that alternatively one of the selected response signals R1 or R2 is blocked form the detector 12. Further details of detecting different spectral components by means of an optical shutter are disclosed in the application EP 05105036.7 of the same applicant.

The probe signal S1 might be an amplitude modulated light signal, a single pulse or a sequence of pulses.

Regarding the low Raman signal level, a common averaging process might not deliver a sufficient signal-to-noise ratio (SNR) within an acceptable time frame. Therefore, instead of using single pulses, a code correlation technique is used, which significantly improves signal strength and thus SNR.

Whereas pseudo random codes as probing sequences are often suggested for correlation procedures, remaining side lobes in the autocorrelation result limit their usefulness in test instruments. On the contrary, complementary codes, in particular Golay codes, show at least under ideal conditions, no side lobes in the sum of their respective autocorrelation products. A Raman scatter signal taken by reflectometric measurements from an optical fiber is well suited for such a correlation technique because of its rather homogeneous character.

Using such correlation technique, the light source 2 is modulated according to a specific predetermined digital sequence. The response signals S1 and S2 are composed of an overlay of a plurality of corresponding shifted impulse responses from the DUT. To determine the resulting impulse responses and therewith the resulting power responses P1 and P2, the analyzing circuit 13 might perform a correlation between each the stimulus signal and the partial responses received. As result of these correlations, the power responses P1 and P2 versus time are determined. Alternatively this correlation might be performed in the digital time domain by sampling both the partial responses and digitally convoluting the sampled sequences with the predetermined digital signal.

The autocorrelation function of a digital pseudo random code shows a maximum at zero shift and residual side lobes. Thus, neglecting the side lobes, the correlation of a probe signal S with a response signal from DUT 3 represents the impulse answer of DUT 3. Alternatively, complementary codes like so-called Golay codes can be used. Such codes have the advantage that the side lobes are cancelled out. Further information of applying impulse sequences in OTDR applications is described in the international application PCT/EP2004/052670 of the same applicant.

With the following FIG. 2a-FIG. 2d, a determination of a temperature profile T along an optical fiber will be explained. In this example, the DUT 3 is an optical fiber with a far open end.

Figure 2A:
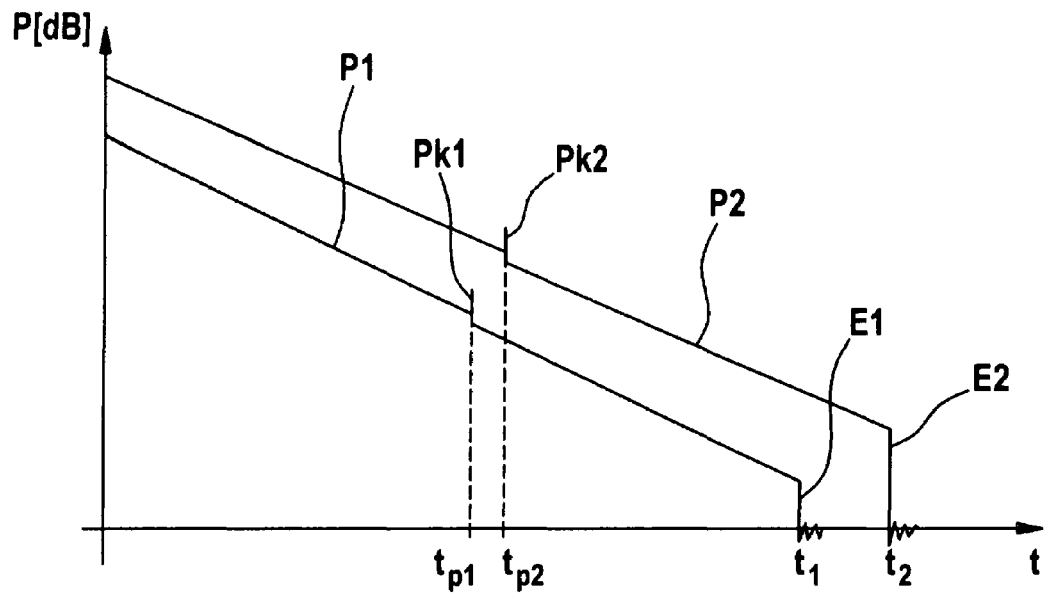
FIG. 2a shows a diagram with exemplary power responses over time returning from the DUT recorded by an OTDR system.

FIG. 2a shows a sketch diagram depicting an exemplary first power response P1 and an exemplary second power response P2 as power at a logarithmic scale P [dB] over the time t.

Bay way of example, First power response P1, further also referred to as Antistokes signal, represents the power of the Antistokes scatterings, and second power signal P2, further also referred to as Stokes signal, represents the power of the Stokes scatterings.

The refractive index of an optical waveguide varies with the wavelength of the traveling optical signal. This leads to a wavelength dependency of the group delay, wherein the group delay is relative velocity variation dependent on the wavelength.

Thus, the propagation speed, also referred to as group velocity, of an optical signal depends on the wavelength of frequency spectrum of the optical signal.

By way of example the optical fiber has a splice somewhere in the middle between the far end and the near end connected to the OTDR system 1. Due to the different group velocities of the first and second response signals, the first power response P1 shows a first peak Pk1 at a time tp1 and the second power response P2 shows a first peak Pk2 at a first time tp2 that is different to the time tp1. As the probe signal S is weakened at this splice, the response signals P1 and P2 show corresponding power degradations in their further run. At the far end of the fiber, the incident probe signal S leaves the fiber resulting in a first edge E1 of the first power response P1 at the first (fiber) run time t1 and a second edge E2 at the second (fiber) run time t2.

Alternatively, to an open far end it is possible to provide a mirror at the far fiber end. In this case, instead of edges E1 and E2, two peaks will occur and second order scattering signals will timely follow these peaks.

For determining the temperature along the fiber, the first power response and the second power response are set into relation to each other. However, due to the velocity difference, events originated at a single location occur at different times for both responses. Thus any event leading to a peak and/or degradation will cause measurement errors. Further, the spatial resolution of the temperature profile is limited to the relative run time difference.

Figure 2B:
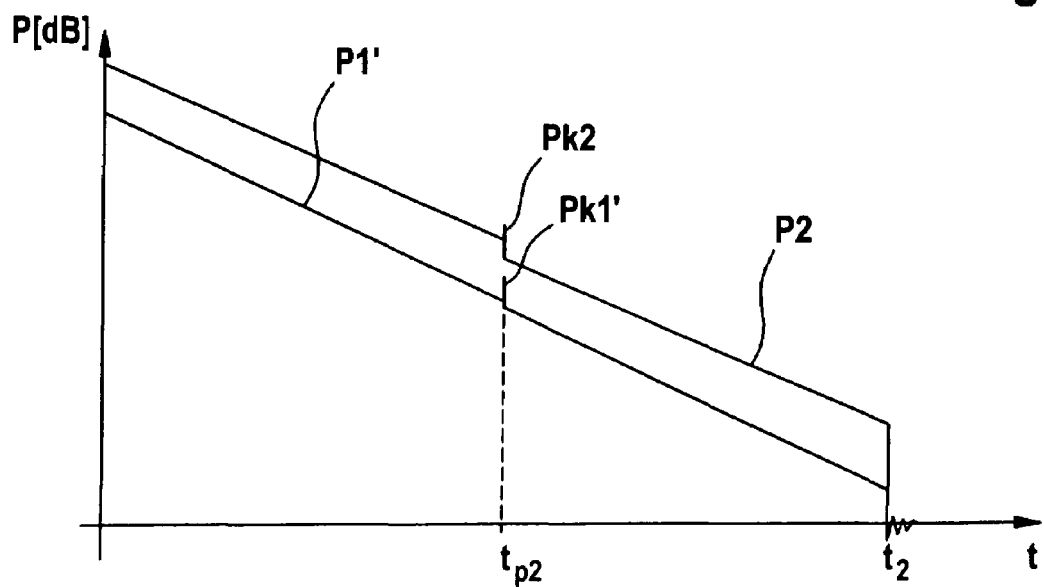
FIG. 2b shows a diagram with time-adjusted power responses according to FIG. 2a, FIG. 2c shows a diagram with attenuation normalized power responses according to FIG. 2b.

For elimination this uncertainty, FIG. 2b shows a sketch diagram depicting an adjusted first power response P1' and the second power response P2 as power at a logarithmic scale P [dB] over the time t according to FIG. 2a. The adjusted first power response P1' is derived from the first power response P1 by stretching the time scale by a time scale conversion factor CF. According to the description, the conversion factor CF corresponds to the ration between the first end time t1 and the second end time t2 (CF=t1/t2). This adjustment further leads to a shift of the first peak Pk1' now being coincident with the second peak Pk2.

Usually, not only the group velocity, but also the attenuation of an optical material is also depending on the wavelength. By way of example, the attenuation of the Antistokes signal P1 is regarded to be greater that the attenuation of the Stokes signal. This attenuation difference might be considered in order to get a correct result.

Figure 2C:
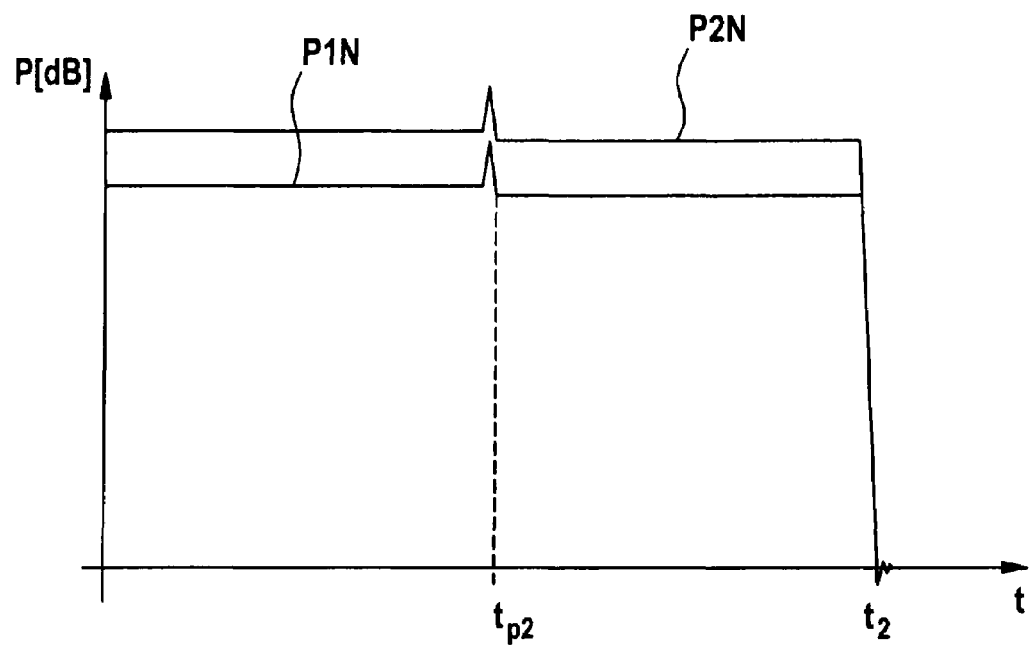
FIG. 2d shows a diagram with a temperature distribution as result of an operation of the power responses of FIG. 2c.

Therefore, FIG. 2c shows a diagram, wherein the power responses P1' and P2 of FIG. 2b are linearly normalized according to the fiber attenuation at each response wavelength $\lambda_1$ and $\lambda_2$ respectively, i.e. the first normalized impulse response signal P1N corresponds to the time-adjusted first impulse response signal P1' multiplied with a first linear function over the length l, wherein the slope corresponds to the attenuation at the first response wavelength $\lambda_1$, and the second normalized impulse response signal R2N corresponds to second power response R2 multiplied with a second linear function over the length l, wherein the slope corresponds to the attenuation at the second response wavelength $\lambda_2$.

The ratio of the signal power of the impulse response signals can be written as follows:

$$P2N/P1N = e^{-h \cdot \Delta v / k \cdot T}, \text{with}$$

h being the Planck constant, $\Delta v = c(1/\lambda_T - 1/(\lambda_T - \Delta\lambda))$ with c being the light speed, k being the Boltzmann constant, $\lambda_T$ being wavelength of he probe signal, $\Delta\lambda = \lambda_2 - \lambda_1$ being the wavelength difference and T the temperature.

After taking the natural logarithm of both sides, the following result is obtained:

$$\log(P2N/P1N) = \log P2N - \log P1N = -h \cdot \Delta v / k \cdot T$$

Thus, the log difference between first normalized power response P1N and second power response R2N is proportional to the inverse of the temperature (~1/T).

The attenuation of the fiber can be derived from a data sheet depicting the fiber attenuation over wavelength or can be derived from the measurement itself.

Figure 2D:
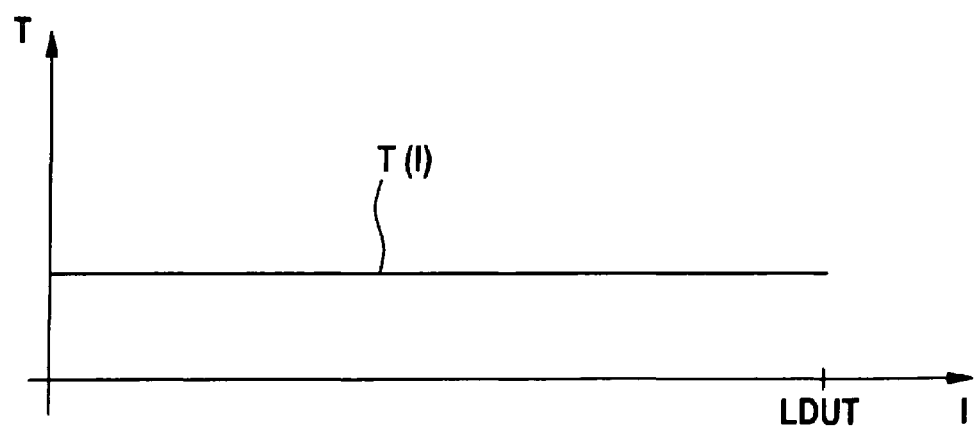

FIG. 2d shows a diagram with a temperature distribution curve derived from FIG. 2c as a function of the temperature T over the fiber length l. As described under FIG. 2b the distance between the normalized impulse response signals is proportional to the inverse of the temperature. As for the simple example described here the temperature is assumed to be constant over the whole fiber, the distance between both normalized responses of FIG. 2c is constant over the time t, and thus the temperature curve T(l) shown here is a constant over the length of the fiber. For converting the curves over time (e.g. the first normalized power response P1N and the second normalized power response P2) into curves over location, the second group velocity is used as time-to-location conversion factor TLF. This factor can be derived by determining the ratio between the second run time t2 and the known fiber length LDUT:

$$TLF = LDUT/t2$$

$$P1N(l) = P1N(t*TLF)$$

$$P2N(l) = P2N(t*TLF)$$

Figure 3A:
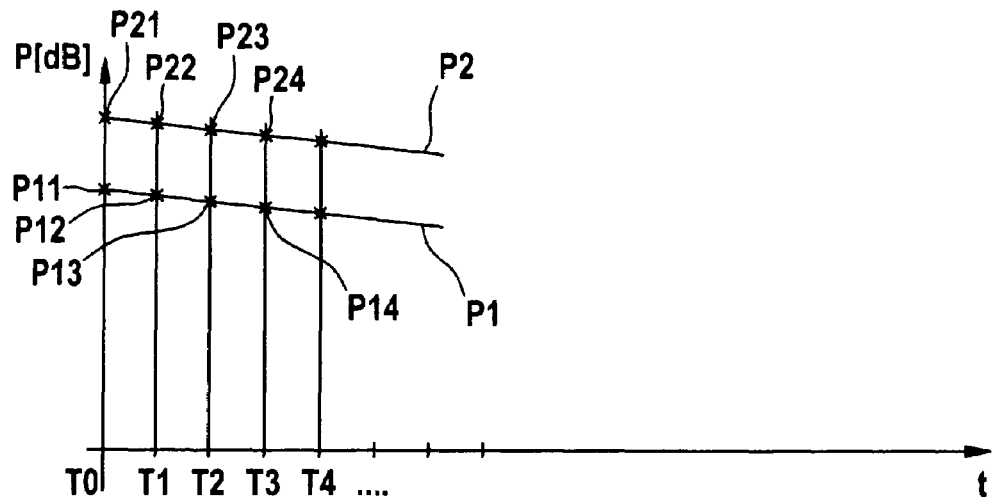
FIG. 3a shows a diagram with sampled power values according to a defined time grid.

In an alternative to determining continuous power responses P1 and P2, the analyzer 13 takes power values of both first and second response signals R1 and R2 at distinct equidistant time instances. Therefore FIG. 3a shows an exemplary section of FIG. 2a with the first power response P1 and the second power response P2. FIG. 3a further shows a first exemplary set of power values P11, P12, P13, P14 of the first power response P1, and a second exemplary set of power values P21, P22, P23, P24 of the second power response P2, the values being taken at equidistant time instances T0, T1, T2, T3, T4.

Figure 3B:
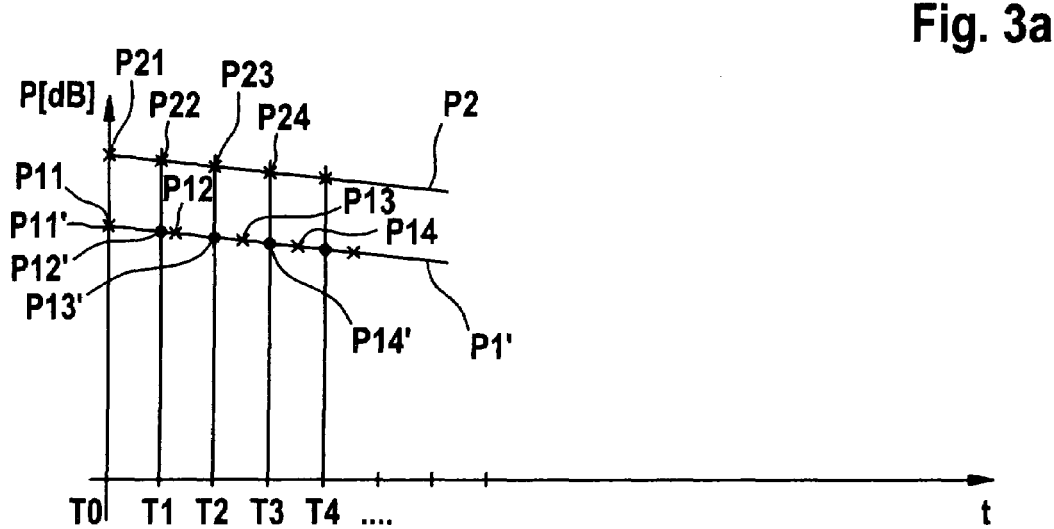
FIG. 3b shows a diagram with interpolated power values.

FIG. 3b shows an exemplary section of FIG. 2b with the time-adjusted first power response P1 and the second power response P2. According to FIG. 3a further the first exemplary set of power values P11, P12, P13, P14 of the first power response P1, and a second exemplary set of power values P21, P22, P23, P24 are depicted. However, as the time scale of the time-adjusted first power response P1' has changed, the values of the first set of values do not match to the time grid of the first set of values. To be able to process the discrete power responses in order to obtain a corresponding discrete result (e.g. a temperature function at discrete location points), an interpolation is performed to transform the first set of values P11, P12, P13, P14 into a set of adapted or interpolated values P11', P12', P13', P14'. Now, the physical property (e.g. temperature) can be determined as a sequence of values derived from the adapted sequence of first power values (P11', P12', P13', P14') and the second sequence of power values (P21, P22, P23, P24). As example, the temperature T a the time instant Ti can be written as:

$$T(i) = f(P1i', P2i), i \text{ being any number between 0 and}$$
$$n = t2/(T1-T0)$$

For deriving the interpolated values P11', P12', P13', P14' from the first set of values P11, P12, P13, P14, a plurality of interpolation methods are known, e.g. a linear interpolation, a square interpolation or a so-called cubic spline interpolation constructed of piecewise third-order polynomials.

What is claimed is:

1. An optical reflectometry system for determining a property of a device under test—DUT—, comprising:
    an optical selector adapted for receiving an optical scatter signal returning from the DUT in response to a probe signal launched into the DUT, wavelength dependent separating a first response signal and a second response signal from the scatter signal,
    an optical detector adapted for determining a first power response of the first response signal and a second power response of the second response signal, and
    an analyzer adapted for time-adjusting the first power response and the second power response to each other in order to compensate a group velocity difference between the first response signal and the second response signal within the DUT, and determining the physical property on the base of the time-adjusted power responses.

2. The system of claim 1, wherein the analyzer is adapted for determining an adjusted first power response by stretching or compressing the time scale of the first power response by a time scale conversion factor.

3. The system of claim 2, wherein the analyzer is adapted for determining the time scale conversion factor on the base of the length and the dispersion property of the DUT, and the wavelength difference between a first center wavelength of a wavelength spectrum of the first response signal and a second center wavelength of a wavelength spectrum of the second response signal.

4. The system of claim 2, wherein the analyzer is adapted for determining traveling time values of the first response signal and the second response signal to a distinct location of the DUT, and determining the time scale conversion factor as a ratio of the traveling time values.

5. The system of claim 4, wherein the analyzer is adapted for determining a time difference by timely relating a first edge or peak of the first response signal and a second response edge or peak of the second response signal, wherein both edges or peaks are related to the distinct location of the DUT.

6. The system of claim 2, wherein the analyzer is adapted for determining a first sequence of power values and a second sequence of power values by sampling the first power response and the second power response, by deriving an adapted sequence of first power values by applying an interpolation to the first sequence of power values, and by determining the property as sequence of values derived from the adapted sequence of first power values and the second sequence of power values.

7. The system of claim 1, wherein the first response signal is one of: an Antistokes signal with a center wavelength at a first response wavelength and a Stokes signal with a center wavelength at a second response wavelength, and the second response signal is the other of the Stokes signal or Antistokes signal.

8. The system of claim 7, wherein physical property is a temperature profile along the DUT, and wherein the analyzer is adapted to derive the temperature profile by determining a ratio of the adjusted first power response and the second power response and changing a dependency over the time of the ratio to a dependency over the location along DUT, using the group velocity of the second response signal as conversion factor.

9. The system of claim 1, further comprising a control unit adapted to control the light source such that the stimulus signal comprises a plurality of optical pulses according to a digital sequence, and wherein the analyzer is adapted for convoluting the first power response and the second power response each with said digital sequence.

10. A method of determining a physical property of a device under test—DUT—, comprising:
   receiving an optical scatter signal returning from the DUT in response to a probe signal launched into the DUT,
   wavelength dependent separating a first response signal and a second response signal from the scatter signal,
   determining a first power response of the first response signal and a second power response of the second response signal,
   time-adjusting the first power response and the second power response to each other in order to compensate a group velocity difference between the first response signal and the second response signal within the DUT; and
   determining the physical property on the base of the time-adjusted power responses.

11. A software program or product, stored on a storage device, for controlling the execution of the method of claim 10, when run on a data processing system of the optical reflectometry system.

* * * * *